July 19, 1960 L. J. VANDERBERG 2,945,998
DYNAMIC BRAKING OF ELECTRIC MOTORS
Filed June 25, 1958
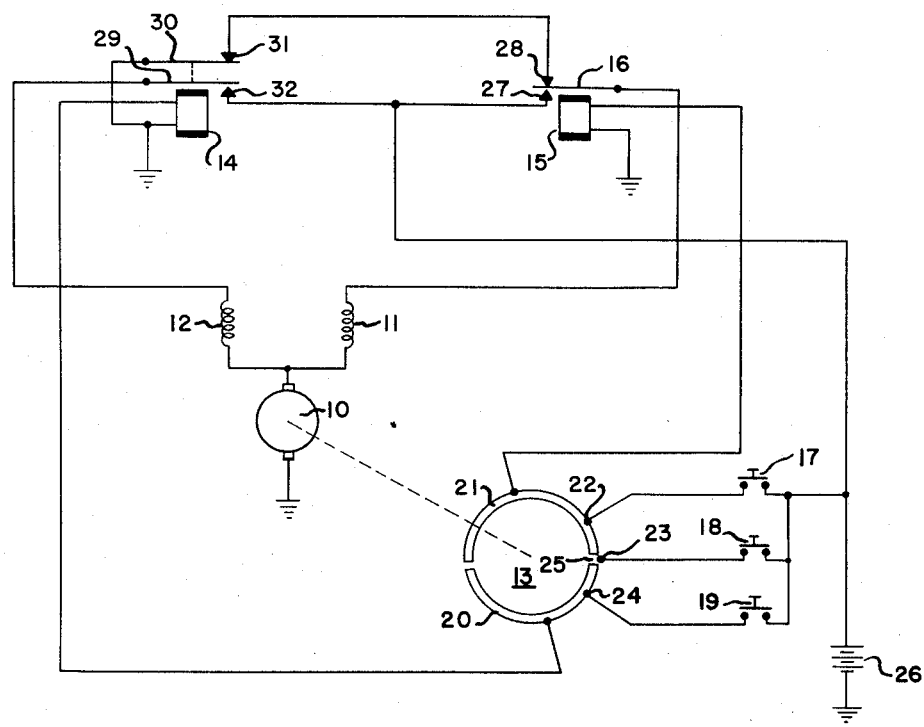
L. J. VANDERBERG
INVENTOR.
BY E. C. McRae
J. R. Faulkner
F. H. Oster
ATTORNEYS

United States Patent Office 2,945,998
Patented July 19, 1960

2,945,998

DYNAMIC BRAKING OF ELECTRIC MOTORS

Lawrence J. Vanderberg, Ann Arbor, Mich., assignor to Ford Motor Company, Dearborn, Mich., a corporation of Delaware Filed June 25, 1958, Ser. No. 744,381

6 Claims. (Cl. 318—373)

This invention relates to dynamic braking of electric motors and more particularly to the dynamic braking of a reversible split field motor.

An object of my invention is to provide a dynamic brake for a motor having a pair of fields for reversible rotation wherein a field current is momentarily induced into the unused field to assist in the dynamic braking of the armature upon the interruption of current through the energized field.

A principal advantage of my invention lies in its utility with servo systems wherein the stopping of a motor driven slector can be accurately controlled.

Another advantage of my invention is that a current is momentarily established through a field winding in parallel to the armature to provide thereby a high flux density and increased braking action.

These and other objects and advantages of my invention will become apparent with reference to the following description taken with the single figure of the drawing.

A motor armature 10 is rotatably carried within series wound fields 11 and 12. These fields are preferably wound on common magnetic core in accordance with well-known electric motor practice. I have shown motor armature 10 mechanically coupled, preferably through reduction gearing, to driven sector switch 13 for the purpose of illustrating the utility of my invention with regard to positive stopping of a servo system at a preselected point. However, it may be readily understood that my invention may be applied with equal facility to electric motors of the type described in any application where it is desired that stopping of said motor be accurately controlled.

As shown in the accompanying drawing, relay 15 is operable to energize motor field 11 through contact 27 to effect counterclockwise switch rotation. Relay 14 is operable to energize motor field 12 through contact 32 to provide clockwise rotation.

Relays 14 and 15 are respectively connected to segments 20 and 21 of segment switch 13. A plurality of wiping contacts 22, 23, and 24 are engageable with segment switch 13 and are connected to battery 26 through a plurality of push buttons 17, 18, and 19, respectively. In this manner, either arcuate segment of this simplified servo system may be energized in accordance with whether the energized wiping contact lies upon segment 21 or segment 20. Segments 20 and 21 are divided by a dielectric portion 25. For the purpose of illustration, I have merely shown three stations which the servo system will select by the coincidence of the energized contact and dielectric portion 25.

Relay 15 includes armature 16 and contacts 27 and 28. This relay is commonly referred to as "open before contact" wherein the normally closed contact, in this case contact 28, must be broken before contact is made with the normally open contact 27. Upon the energization of relay 15, such as by depression of push button 17 to energize segment 21, power from battery 26 is applied through contact 27 and armature 16 to counterclockwise series field 11 to cause the motor to rotate so as to bring wiping contact 22 in coincidence with dielectric contact 25.

I have purposely made no provision for the dynamic braking of armature 10 when energized in this manner to rotate sector switch 13 counterclockwise. However, it is anticipated that under light load conditions, the overrun of armature 10 would carry wiping contact 22 across the dielectric gap 25 and into contact with segment 20. This overrun then brings clockwise relay 14 into action to reverse the rotation of armature 10 and to effect dynamic braking in a manner which will subsequently be described. With dynamic braking occurring in one direction only, the circuit is greatly simplified and positioning is more accurate.

Clockwise relay 14 is of the type commonly known as "contact before open" and includes a pair of relay armatures 29 and 30. Armature 30 includes an associated normally closed contact 31 and armature 29 includes a normally open contact 32. The armatures of this relay may be "pointed" in a manner well understod in the relay art to cause contact 31 to open last and close first when compared to contact 32. Armature 29 is connected to motor field 12, armature 30 is grounded, contact 32 is connected to battery 26 and contact 31 is connected to contact 28 on relay 15.

Upon the energization of relay 14, such as by the energization of sector switch segment 20, armature 29 is first brought into registration with contact 32 and then, a fixed time later, contact is broken between armature 30 and contact 31. During the millisecond, or so, when both contacts 32 and 31 are closed, the motor is connected in the manner of a cumulative compound motor in that current flows from battery 26 through armature 29 and, hence, through field 12 to armature 10 to ground (assuming current here to flow in the conventional manner) and current also flows through field 12 and thence through field 11, through relay armature 16, contact 28, contact 31, and relay armature 30 to ground. In other words, a reverse current is flowing through field 11 and this serves to momentarily energize field 11 in a cumulative manner to assist in the clockwise rotation of armature 10. However, this cumulative compound motor connection is only momentary since armature 30 is pulled away from contact 31 thereby opening the circuit of field 11 to ground, causing the motor to run as a series motor with higher torque. Upon the de-energization of relay coil 14, such as would be caused by the rotation of sector switch 13 to carry the energizing contact onto the dielectric portion 25, the sequence of events are reversed and armature 30 comes into registration with contact 31 a fixed time before armature 29 breaks with contact 32. This registration of armature 30 with contact 31, occurring as it does chronologically prior to the breaking of the field 12 circuit, places field 11 in parallel with armature 10 and permits current build up therein in a flux additive direction. Then, when relay armature 29 breaks wth contact 32, a current has been thus pre-established within field coil 11 and very effective dynamic braking force is thus applied to the rotating armature 10 by circulating current in the armature 10 and field 11 due to counter E.M.F. generated in armature 10 to bring armature 10 to a stop in the shortest possible time.

I have found, as an example, with fractional horsepower, split field motors as are commonly used in automotive servo systems, that a minimum contact overlap time of approximately one millisecond in this relay is sufficient to establish a current in field 11 that will allow effective dynamic braking.

It will be understood that the invention is not to be limited to the exact construction shown and described, but that various changes and modifications may be made without departing from the spirit and scope of the invention, as defined in the appended claims.

What is claimed is:

1. An electrical circuit for the operation of an electric motor having a pair of fields operable upon individual energization thereof to effect either clockwise or counterclockwise rotation of the motor armature comprising circuit make and break means operable to energize one of said fields, and means operable prior to the break of said first-named means to momentarily produce a reverse current through a closed path including the other field.

2. An electrical circuit for the operation of a series wound electric motor having a pair of fields operable upon the individual energization thereof through the motor armature to effect either clockwise or counterclockwise motor rotation comprising circuit closing and opening means operable to energize said armature through one of said fields, and circuit means operable prior to the opening of said first-named means to connect the other field in parallel with the armature.

3. An electrical circuit for the operation of a series wound electric motor having a pair of fields operable upon the individual energization thereof through the motor armature to effect either clockwise or counterclockwise motor rotation comprising circuit establishing and opening means operable to energize said armature through one of said fields, and means operated by said first-named means to place the other field in parallel with said armature a fixed time prior to the opening of the circuit established by said first-named means.

4. A dynamic brake circuit for a reversible D.-C. electric motor having a pair of fields operable upon individual energization thereof to effect either clockwise or counterclockwise motor rotation and a common lead, a source of D.-C. power, a relay having a first pair of normally closed contacts and a second pair of normally open contacts, said first pair of contacts being pointed to close a fixed time prior to the opening of said second pair upon de-energization of said relay, said second pair of contacts adapted to apply said source to one of said fields upon the closure thereof, and said second pair of contacts adapted to connect the other field to the common lead upon the closure of said second pair whereby a current is fed from said common lead into said other field a fixed time prior to the opening of said second pair of contacts.

5. An electrical circuit for the operation of an electric motor having a pair of field coils operable upon individual energization thereof to effect either clockwise or counterclockwise rotation of the motor armature comprising, means operable upon energization thereof for energizing one of said field coils, said means being operable upon de-energization to momentarily energize the other field coil, said means including means for short-circuiting said armature through said other field coil to provide dynamic braking for said motor after said other field coil has been momentarily energized.

6. An electrical circuit for the operation of a series wound electric motor having a pair of fields operable upon individual energization thereof to effect either clockwise or counterclockwise motor rotation comprising, circuit closing and opening means operable to energize said armature through one of said fields, circuit means operable immediately prior to the opening of said first named means to connect the other field in parallel with the armature, and circuit means operable upon the opening of said first named means to short-circuit said armature through said other field.

References Cited in the file of this patent
UNITED STATES PATENTS
2,137,721     Jones                 Nov. 22, 1938